United States Patent
Gritsch

(10) Patent No.: US 7,213,520 B2
(45) Date of Patent: May 8, 2007

(54) DIESEL ELECTRIC LOCOMOTIVE

(75) Inventor: Christian Gritsch, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/060,310

(22) Filed: Feb. 18, 2005

(65) Prior Publication Data

US 2005/0183623 A1    Aug. 25, 2005

(30) Foreign Application Priority Data

Feb. 20, 2004 (DE) .................. 10 2004 008 485

(51) Int. Cl.
*B61C 11/00* (2006.01)
(52) U.S. Cl. .................................. 105/26.1
(58) Field of Classification Search .......... 105/26.1, 105/26.05, 27, 35
See application file for complete search history.

(56) References Cited

U.S. PATENT DOCUMENTS 5,436,538 A * 7/1995 Garvey et al. ............. 318/52
6,066,935 A * 5/2000 Eisele ...................... 318/773

FOREIGN PATENT DOCUMENTS

DE    42 17 303 A1    12/1992

* cited by examiner

*Primary Examiner*—S. Joseph Morano
*Assistant Examiner*—Robert J. McCarry, Jr.
(74) *Attorney, Agent, or Firm*—Harness, Dickey & Pierce, P.L.C.

(57) ABSTRACT

A diesel electric locomotive includes a main generator for a drive apparatus and an auxiliary generator for auxiliary appliances, connected to a diesel engine. The main generator is connected by a first rectifier to the direct current traction intermediate circuit of the drive apparatus. The auxiliary generator is connected via a second rectifier to a direct current auxiliary operation intermediate circuit of the auxiliary appliances. The main generator is likewise connected via the rectifier and a DC/DC converter to the direct current auxiliary operation intermediate circuit.

8 Claims, 2 Drawing Sheets

DIESEL ELECTRIC LOCOMOTIVE

The present application hereby claims priority under 35 U.S.C. §119 on German patent application numbers DE 10 2004 008 485.8 filed Feb. 20, 2004, the entire contents of which is hereby incorporated herein by reference.

FIELD OF THE INVENTION

The invention generally relates to a diesel electric locomotive. Preferably, it relates to one in which a main generator for a drive apparatus and an auxiliary generator for auxiliary appliances are connected to a diesel engine, and/or in which the main generator is connected via a first rectifier to the direct current traction intermediate circuit of the drive apparatus.

BACKGROUND OF THE INVENTION

DE 42 17 303 A1 discloses a fan unit which is supplied from an auxiliary operation power supply system. The fan unit is used for cooling a diesel engine in a diesel electric locomotive. An auxiliary generator is used to supply electrical power to the auxiliary operation power supply system. The fan unit is driven by a motor.

In the case of diesel electric locomotives, in particular in the case of those of North American type, one or more three-phase auxiliary generators are provided in order to supply the auxiliary appliances, and are connected to the diesel engine. In this case, voltage and frequency fluctuations occur in the electrical power supply system for the auxiliary appliances, which is fed from the auxiliary generator, owing to the variable rotation speed of the diesel engine. Until now, it has therefore been normal to connect contactors, converters or phase gating controllers upstream of the auxiliary appliances.

In order to make it possible to supply the auxiliary appliances with electrical power all the time, it has until now been necessary for the diesel engine always to be operated at an appropriately high rotation speed. Even when the locomotive is being braked and, in consequence, the drive apparatus does not require any power to be supplied to it, it is necessary to continue to operate the diesel engine at an appropriate rotation speed solely for the auxiliary appliances. The rotation speed of the diesel engine is thus at times governed solely by the auxiliary appliances. A further disadvantage is that the auxiliary appliances cannot be supplied if the auxiliary generator fails. In this situation, the entire locomotive is unserviceable, since the auxiliary appliances are required for correct operation.

SUMMARY OF THE INVENTION

An embodiment of the invention includes a diesel electric locomotive which is less susceptible to faults overall and/or, averaged over a journey, in particular however during braking, consumes less diesel fuel than a locomotive of comparable power.

According to an embodiment of the invention, an object may be achieved by the auxiliary generator being connected via a second rectifier to a direct current auxiliary operation intermediate circuit of the auxiliary appliances, and/or by the main generator being connected via the first rectifier and a DC/DC converter to the direct current auxiliary operation intermediate circuit.

The auxiliary generator is mainly used to feed the direct current auxiliary operation intermediate circuit. However, a second, redundant feed option may also be provided in the direct current auxiliary operation intermediate circuit. For this purpose, the first rectifier, which is arranged downstream from the main generator, is connected via a DC/DC converter to the direct current auxiliary operation intermediate circuit, in addition to being connected to the direct current traction intermediate circuit. The DC/DC converter is used to convert the higher voltage which is required for the drive apparatus to a lower voltage for the auxiliary appliances.

This advantageously results in two redundant options for supplying the auxiliary appliances, so that the auxiliary appliances can still be supplied even if the auxiliary generator fails.

Another advantage is that, when the locomotive is being braked, the diesel engine of an embodiment can be switched off or can be operated at idle, thus saving diesel fuel. The supply of electrical power which is still required for the auxiliary appliances is then provided by the motor for the drive apparatus producing electrical power in the generator mode, which is passed via the converter associated with the motor in the drive apparatus and via the DC/DC converter to the direct current auxiliary operation intermediate circuit, and from there to the auxiliary appliances.

Even when the diesel engine is running at a low rotation speed which on its own would not be sufficient to provide an adequate supply for the auxiliary appliances via the auxiliary generator, an adequate supply can nevertheless be ensured by some of the required energy being fed into the direct current auxiliary operation intermediate circuit from the main generator via the first rectifier and the DC/DC converter. The rotation speed of the diesel engine therefore does not need to be increased just to supply the auxiliary appliances.

The diesel electric locomotive according to an embodiment of the invention achieves the advantage that there is no need to increase the power of the diesel engine, and thus the fuel consumption, just for the auxiliary appliances. Furthermore, a redundant supply for the auxiliary appliances means that operation of the locomotive is still possible even if the auxiliary generator were to fail.

By way of example, the direct current auxiliary operation intermediate circuit is connected to a corresponding direct current auxiliary operation intermediate circuit of a coupled locomotive.

This results in the advantage that the power supply for the auxiliary appliances in a locomotive can also be provided from a coupled second locomotive if the supply in the first locomotive is not guaranteed, owing to a fault. This is because a number of locomotives are frequently operated in a traction group for a heavy train.

By way of example, a motor for a fan which is associated with a cooler for the diesel engine is connected directly to the auxiliary generator.

By way of example, contactors are provided between the auxiliary generator and the motor.

This fan is supplied with power only when the auxiliary generator is also operating. A further motor for a fan is fed, electronically actuated by the direct current auxiliary operation intermediate circuit, and is thus always ready to operate. This results in the advantage that there is no need for a complex fan controller and thus for electronic components, because any required amount of air can be provided by the combination of the two fans.

In particular, since only the further motor and not the motor that is connected to the auxiliary generator has a converter connected upstream from it, this saves a converter. If the diesel engine were to be switched off during braking, the fan which is connected to the auxiliary generator does not operate. However, this is acceptable because the diesel engine then requires only a relatively small amount of cooling.

The diesel electric locomotive according to an embodiment of the invention achieves the advantage that the auxiliary appliances can be supplied with electrical power even when the diesel engine in the locomotive has been switched off during braking or when descending hills. Furthermore, a redundant power supply is advantageously available for the auxiliary appliances.

BRIEF DESCRIPTION OF THE DRAWINGS

Exemplary embodiments of the diesel electric locomotive according to the invention will be explained in more detail with reference to the drawings, wherein.

DETAILED DESCRIPTION OF THE EXEMPLARY EMBODIMENTS

Figure 1:
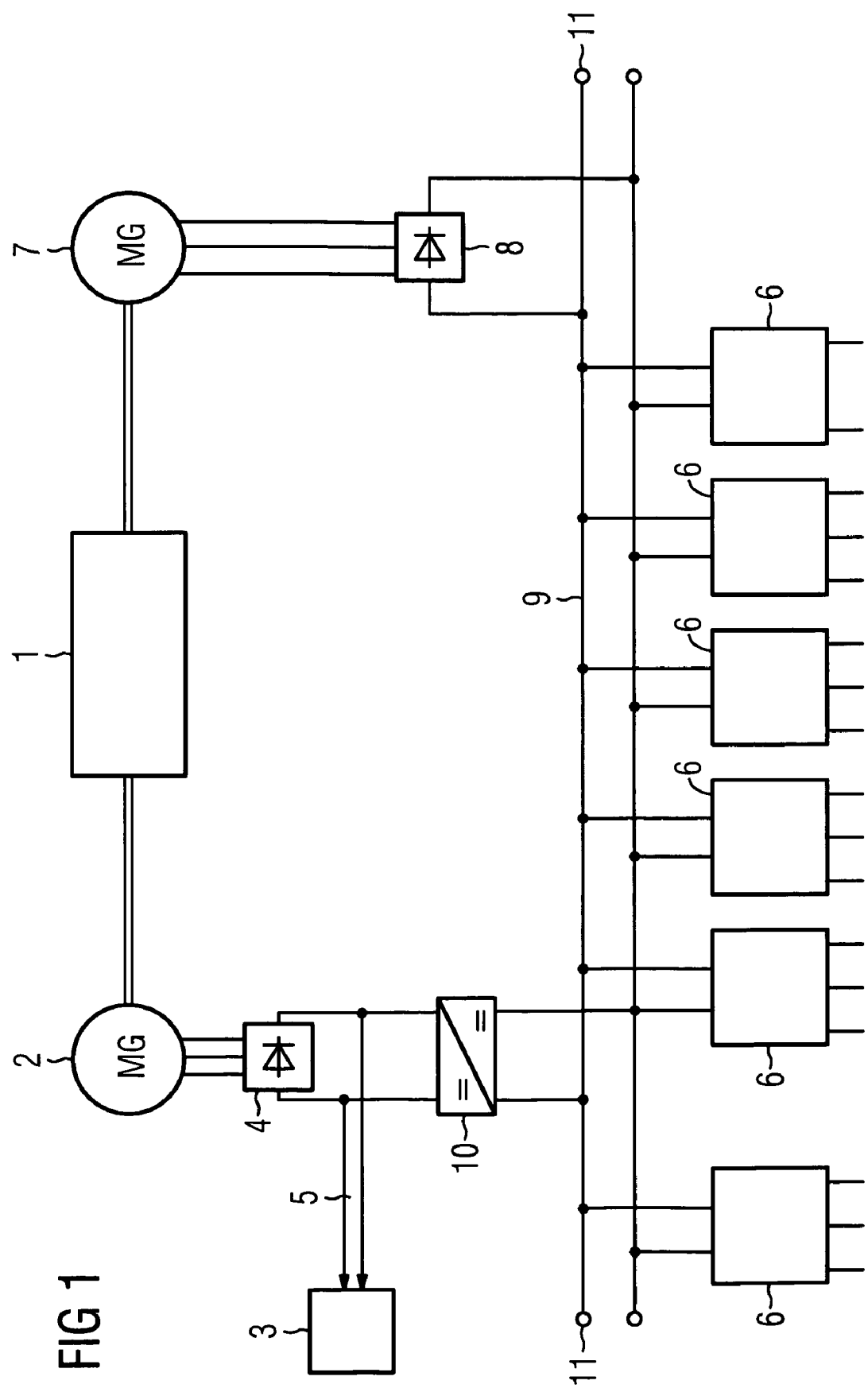
FIG. 1 shows a power supply circuit for a diesel electric locomotive according to an embodiment of the invention.
Figure 2:
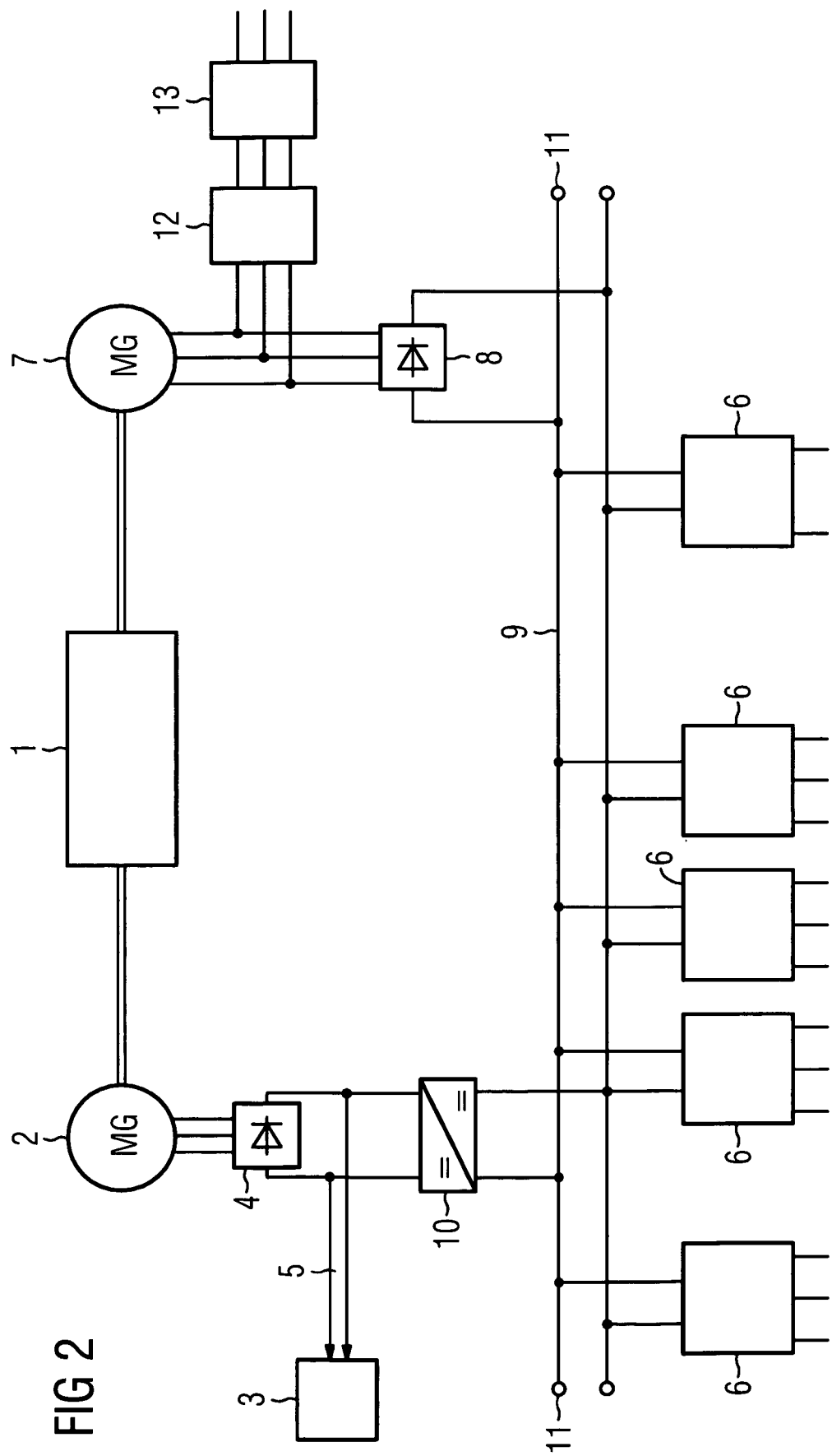
FIG. 2 shows the same power supply circuit, but with connections to an auxiliary generator for a motor which is intended to operate a fan.

In both FIG. 1 and FIG. 2, a diesel engine 1 in a diesel electric locomotive is connected to a main generator 2. This is used for operation of the drive apparatus 3 and is for this purpose connected via a first rectifier 4 to a direct current traction intermediate circuit 5, to which the drive apparatus 3 is connected. The drive apparatus 3 has a converter and a motor.

The diesel engine 1 is also connected to an auxiliary generator 7 in order to operate various auxiliary appliances 6 which, by way of example, may be fans or heaters. This auxiliary generator 7 is electrically connected via a second rectifier 8 to a direct current auxiliary operation intermediate circuit 9, to which the auxiliary appliances 6, the upstream components, such as converters by way of example, are connected.

In order to allow the auxiliary appliances 6 to be supplied with electrical power even when the auxiliary generator 7 is not in operation, the first rectifier 4, which is connected on the input side to the main generator 2, is likewise connected via a DC/DC converter 10 to the direct current auxiliary operation intermediate circuit 9. The DC/DC converter 10 is required since the direct current auxiliary operation intermediate circuit 9 requires a different voltage than the direct current traction intermediate circuit 5.

This provides a redundant electrical power supply for the auxiliary appliances 6. Even when the diesel engine 1 in the locomotive is switched off during braking, electrical power is available for the direct current auxiliary operation intermediate circuit 9 because the electric motor for the drive apparatus 3 is operated as a generator by the train that is still rolling, thus producing electrical power via the converter in the drive apparatus 3 and via the DC/DC converter 10 for the auxiliary appliances 6.

A corresponding direct current auxiliary operation intermediate circuit in another coupled locomotive can be connected to the direct current auxiliary operation intermediate circuit 9 on both sides, via couplings 11. In consequence, if the train is being drawn by two or more locomotives, the auxiliary appliances 6 can also be supplied from a coupled locomotive.

As can be seen in FIG. 2, a motor 13 for a fan is additionally directly connected to the auxiliary generator 7 via connections 12 or contactors. This fan is used to cool the diesel engine 1. A further motor for another fan, which is used for cooling the diesel engine, is electronically controlled as one of the auxiliary appliances 6, and is connected to the direct current auxiliary operation intermediate circuit 9. When the diesel engine 1 in the locomotive has been switched off or is operated at idle during braking or when descending hills, the electronically actuated fan which is driven by the further motor can provide the required cooling power on its own. This is because the fan that is connected to the motor 13 is then not operated, since the auxiliary generator 7 is not supplying any electrical power.

A redundant power supply is provided for the auxiliary appliances 6. Furthermore, the diesel engine 1 can also be switched off while traveling, since electrical power which is produced in the generator mode in the drive apparatus 3 is then advantageously also available for the auxiliary appliances 6.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A diesel electric locomotive, comprising:
a diesel engine;
a main generator for a drive apparatus, the main generator being connected to the diesel engine; and
an auxiliary generator for auxiliary appliances, the auxiliary generator being connected to the diesel engine; wherein
the main generator is connected via a first rectifier to a direct current traction intermediate circuit of the drive apparatus,
the auxiliary generator is connected via a second rectifier to a direct current auxiliary operation intermediate circuit of the auxiliary appliances, and
the main generator is connected via the first rectifier and a step-down transformer to the direct current auxiliary operation intermediate circuit.

2. The diesel electric locomotive as claimed in claim 1, wherein the direct current auxiliary operation intermediate circuit is connected to a corresponding direct current auxiliary operation intermediate circuit of a coupled locomotive.

3. The diesel electric locomotive as claimed in one of claim 1, further comprising:
a motor for a fan associated with a cooler for the diesel engine, connected directly to the auxiliary generator.

4. The diesel electric locomotive as claimed in one of claim 2, further comprising:
a motor for a fan associated with a cooler for the diesel engine, connected directly to the auxiliary generator.

5. A diesel electric locomotive, comprising:
a main generator for a drive apparatus and an auxiliary generator for auxiliary appliances, each connected to a diesel engine, the main generator being connected via a first rectifier to the drive apparatus, and the auxiliary generator being connected via a second rectifier to a direct current auxiliary operation intermediate circuit of the auxiliary appliances; wherein the main generator is connected via the first rectifier and a step-down transformer to the direct current auxiliary operation intermediate circuit.

6. The diesel electric locomotive as claimed in claim 5, wherein the direct current auxiliary operation intermediate circuit is connected to a corresponding direct current auxiliary operation intermediate circuit of a coupled locomotive.

7. The diesel electric locomotive as claimed in one of claim 5, further comprising:

a motor for a fan associated with a cooler for the diesel engine, connected directly to the auxiliary generator.

8. The diesel electric locomotive as claimed in one of claim 6, further comprising:

a motor for a fan associated with a cooler for the diesel engine, connected directly to the auxiliary generator.

* * * * *